United States Patent
Wiley

(10) Patent No.: US 9,342,893 B1
(45) Date of Patent: May 17, 2016

(54) METHOD AND APPARATUS OF PERFORMING IMAGE SEGMENTATION

(71) Applicant: STRATOVAN CORPORATION, Davis, CA (US)

(72) Inventor: David Wiley, Woodland, CA (US)

(73) Assignee: STRATOVAN CORPORATION, Davis, CA (US)

( * ) Notice: Subject to any disclaimer, the term of this patent is extended or adjusted under 35 U.S.C. 154(b) by 0 days.

(21) Appl. No.: 14/668,345

(22) Filed: Mar. 25, 2015

Related U.S. Application Data

(63) Continuation-in-part of application No. 14/172,583, filed on Feb. 4, 2014, now abandoned, which is a continuation of application No. 13/489,404, filed on Jun. 5, 2012, now Pat. No. 8,644,578, which is a continuation-in-part of application No. 12/430,545, filed on Apr. 27, 2009, now Pat. No. 8,194,964.

(60) Provisional application No. 61/525,165, filed on Aug. 18, 2011, provisional application No. 61/047,982, filed on Apr. 25, 2008.

(51) Int. Cl.
*G06K 9/46* (2006.01)
*G06T 7/00* (2006.01)
*G06K 9/62* (2006.01)

(52) U.S. Cl.
CPC ............... *G06T 7/0081* (2013.01); *G06K 9/46* (2013.01); *G06K 9/6201* (2013.01); *G06K 2009/4666* (2013.01)

(58) Field of Classification Search
CPC ... A61B 10/0233; G06K 9/46; G06K 9/6201; G06T 7/0081
USPC ............................................. 356/39; 382/128
See application file for complete search history.

(56) References Cited

U.S. PATENT DOCUMENTS

| | | | |
|---|---|---|---|
| 8,041,619 B1 | 10/2011 | Liu et al. | |
| 8,064,673 B2 | 11/2011 | Kirchberg et al. | |
| 8,068,650 B2 | 11/2011 | Kumar et al. | |
| 8,073,226 B2 | 12/2011 | Karag et al. | |
| 8,077,954 B2 | 12/2011 | Kale et al. | |
| 8,249,349 B2 * | 8/2012 | Blake | G06K 9/6224 235/435 |
| 2004/0070583 A1 | 4/2004 | Tsai et al. | |
| 2005/0165296 A1 | 7/2005 | Ma | |
| 2007/0047794 A1 | 3/2007 | Lang et al. | |
| 2008/0030497 A1 | 2/2008 | Hu et al. | |
| 2010/0027862 A1 * | 2/2010 | Kale | G06K 9/4609 382/131 |
| 2012/0121153 A1 | 5/2012 | Xue et al. | |
| 2012/0177267 A1 | 7/2012 | Chen et al. | |
| 2012/0262703 A1 * | 10/2012 | Zahniser | G01N 15/1475 356/39 |
| 2014/0228707 A1 * | 8/2014 | Brieu | A61B 5/00 600/567 |
| 2015/0193667 A1 * | 7/2015 | Acharya | G06K 9/38 382/165 |

* cited by examiner

*Primary Examiner* — Nathan Ha
(74) *Attorney, Agent, or Firm* — Foley & Lardner LLP

(57) ABSTRACT

In general, embodiments of the invention comprise systems and methods for performing image segmentation from image data. According to certain aspects, methods of the invention include constructing a fragment tree representation of image data. An image is segmented into regions of pixels having similar image characteristics, called fragments, each fragment (region) is then compared to its neighbors to determine a graph or hierarchical relationship among all regions. Groups of fragments can be selected by an operator or automatically to define a signature of an object. This signature can then be used to search or traverse a fragment tree any image in order to identify similar objects either automatically or manually.

20 Claims, 11 Drawing Sheets

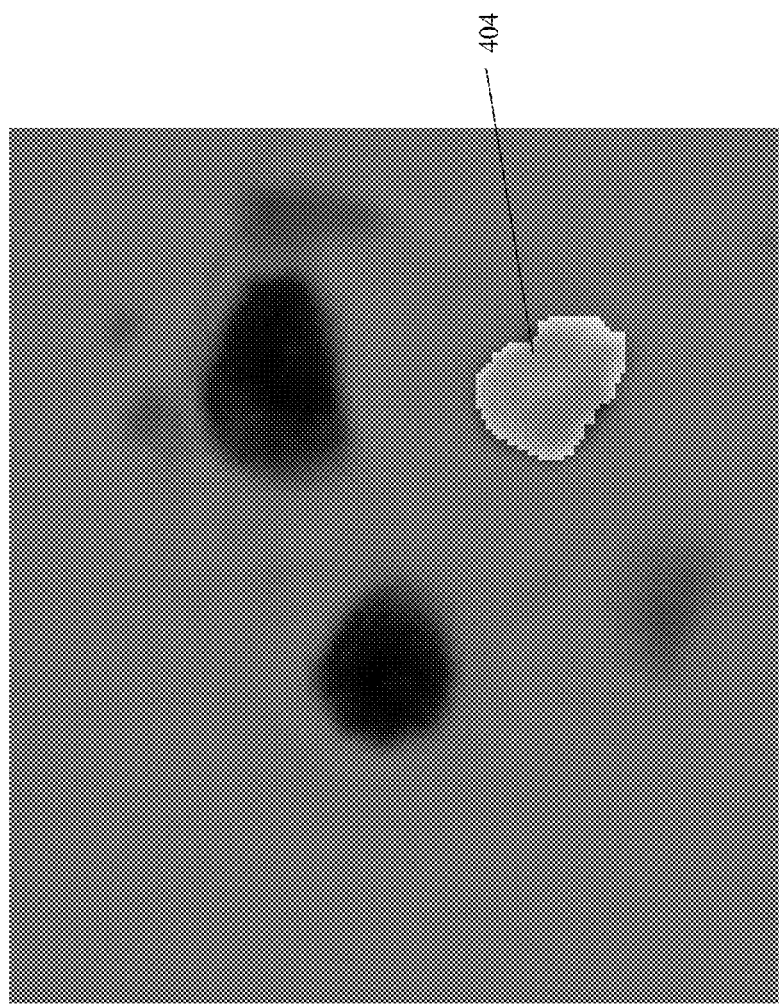
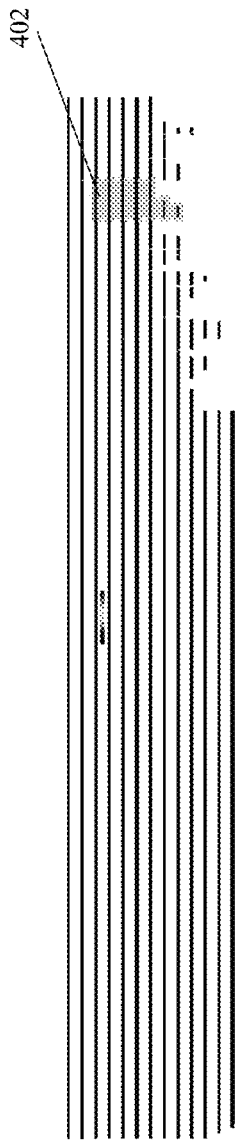
FIG. 4A
FIG. 4B

METHOD AND APPARATUS OF PERFORMING IMAGE SEGMENTATION

CROSS-REFERENCE TO RELATED APPLICATIONS

This application is a continuation-in-part of U.S. patent application Ser. No. 14/172,583, filed Feb. 4, 2014, which is a continuation of U.S. patent application Ser. No. 13/489,404, filed Jun. 5, 2012, now U.S. Pat. No. 8,644,578, which claims priority to U.S. Provisional Application No. 61/525,165 filed Aug. 18, 2011. U.S. patent application Ser. No. 13/489,404 is also a continuation-in-part of U.S. patent application Ser. No. 12/430,545 filed Apr. 27, 2009, now U.S. Pat. No. 8,194,964, which claims priority to U.S. Provisional Application No. 61/047,982 filed Apr. 25, 2008. The contents of all such applications are incorporated herein by reference in their entirety.

FIELD OF THE INVENTION

The present invention relates to imaging systems, and more particularly to methods and apparatuses for analyzing images to detect objects of interest using image segmentation.

BACKGROUND OF THE INVENTION

U.S. Pat. No. 8,194,964, commonly owned by the present assignee, dramatically advanced the state of the art by providing powerful technologies for identifying anatomic regions of a person delineated from image data. Likewise, commonly owned U.S. Pat. No. 8,644,579 advanced the state of the art by providing technologies for automatically identifying objects of interest from imaging scans. The present inventors have recognized that aspects of these technologies can be adapted and extended for other medical and scanning image segmentation applications.

For example, image segmentation is the process of delineating pixels into groups within an image (typically called objects) to facilitate a wide variety of machine/computer vision type tasks. For example, identifying a human face in a photograph, identifying lung nodules in a CT scan of a lung cancer patient, to identifying explosives in a CT scan of baggage at an airport.

Image data encompasses, for example, traditional two-dimensional (2D) digital photographs, satellite imagery, and ultrasound; and for three-dimensional (3D) image data include, but are not limited to, computed tomography scans such as X-ray CT, positron emission tomography (PET), and magnetic resonance imaging (MRI). In 2D a pixel represents characteristics within a region of space by characteristics such as intensity (for a black and white or greyscale image), RGB for red, green and blue color components, near infrared (NIR) for heat signatures and more. In 3D a voxel (equivalent in concept to a pixel) represents characteristics within a region of space such as density (as measured by X-ray attenuation), atomic properties captured by MRI or PET, or even simulated data obtained from scientific simulations of physical phenomena. Image data represents multidimensional characteristics of some spatially related phenomena. In the present specification, 2D and 3D data are treated the same and the term pixel is used to mean both pixel (2D) and voxel (3D).

Machine/computer vision is the task of programming a computer to identify known features or objects within image data. This task typically requires a processing step called image segmentation that groups pixels into regions that represent objects. There are often additional processing steps that follow that attempt to classify delineated objects into various groups (or classes).

Machine/computer vision and image segmentation are pervasive throughout contemporary society and can be used to analyze, process, or evaluate nearly every digital image captured. However, many opportunities for improvement in existing incarnations of these technologies remain.

SUMMARY OF THE INVENTION

In general, embodiments of the invention comprise systems and methods for performing image segmentation from image data. According to certain aspects, methods of the invention include constructing a fragment tree representation of image data. An image is segmented into regions of pixels having similar image characteristics, called fragments, each fragment (region) is then compared to its neighbors and are joined (through a union operation) if similar, the new union is then compared to its neighbors in turn; this process repeats until no more pairs of neighboring regions are deemed similar enough to join together—this process determines a graph or hierarchical relationship among all fragments. Groups of fragments can be selected by an operator or automatically to define a signature of an object. This signature can be used to search or traverse a fragment tree of any image in order to identify similar objects either automatically or manually.

In accordance with these and other aspects, a method according to embodiments of the invention includes identifying fragments in an image, wherein a plurality of certain of the fragments collectively correspond to a single object of interest in the image; and constructing a fragment tree representation of the image by comparing characteristics of the fragments in the image to one another to establish a relationship between the fragments.

BRIEF DESCRIPTION OF THE DRAWINGS

FIGS. 4A and 4B illustrate example operations that can be performed using a fragment tree created in accordance with embodiments of the invention.

DETAILED DESCRIPTION OF THE PREFERRED EMBODIMENTS

Figure 1:
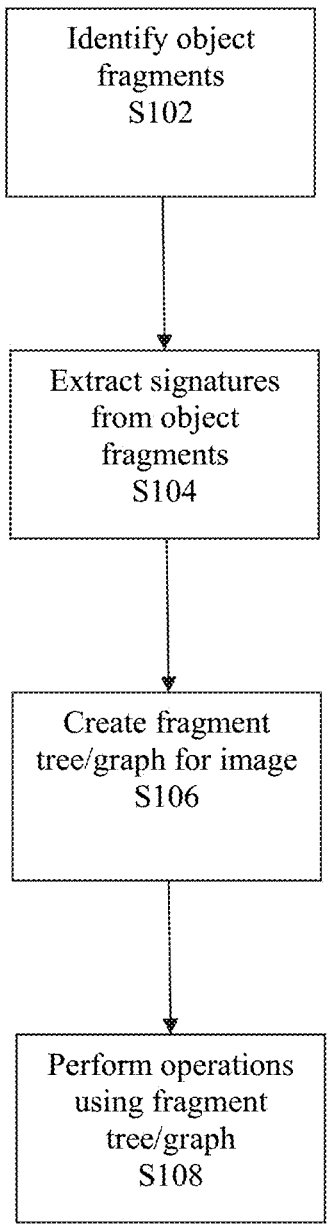
FIG. 1 is a flowchart illustrating an example method according to embodiments of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present invention extends the core technologies of U.S. Pat. No. 8,194,964 and U.S. Pat. No. 8,644,579 to other imaging applications.

According to certain aspects, the present inventors recognize that traditional image segmentation seeks to group pixels into clusters such that all pixels in each cluster share similar characteristics. The human eye performs this task nearly instantaneously when processing visual information. However, it is a significant challenge to program a computer to perform this task. The task of programming is non-trivial if the images to be processed represent objects that have well-defined boundaries. In this case, boundaries can be considered the transition from one object to another and are often identifiable by computing the gradient at each pixel. Regions having "high" gradient typically represent object boundaries and regions having "low" gradient typically represent homogeneous regions. It is possible, however, to have objects that consist of "high" gradients in their interior—not just at their boundaries. Thus, to define what constitutes high and low gradient depends upon the image being processed.

If the task is to find homogenous objects with high-gradient boundary and the image data is guaranteed to represent objects such that they are completely outlined by a high-gradient boundary, then the task of image segmentation according to embodiments of the invention is to identify groups of pixels by establishing a graph connectivity among two pixels having low-gradient estimate between them and by not connecting pixels that have high-gradient between them. Thus, image segmentation can, in general, be considered to be the comparison of two neighboring pixels and establishing a relationship between if and only if their image characteristics are "similar". In principle, this seems simple. In practice, on real world image data, this task is one of the most, if not the most, challenging in computer science today. In this spirit many security capabilities are dependent upon solving an image segmentation and classification problem, for example, CAPTCHA which is used by websites in that visitors to the website must look at an image and type into an edit box what is observed in the image prior to being granted access to the website to insure that the website visitor is human (and not a web crawling robot).

Embodiments of the invention relate to basic concepts of merging and splitting. In this regard, one problem of image segmentation is the decision that binds two pixels to one another. If objects were represented precisely within an image such that each object has well defined gradient boundaries, then this task is trivial. However, real world image data typically results in objects having poorly defined boundaries between them such that image segmentation algorithms typically merge or split pixels incorrectly—thus forming the object groups incorrectly. This error has significant impact on all downstream processes that may utilize the output of an image segmentation step.

Embodiments of the invention address the merging/splitting issue in image segmentation by storing the relationships between pixels in a graph or hierarchical representation. In traditional image segmentation, once groups of pixels are formed, there is not enough information retained about the group to allow analyzing such a group by its constituent parts. For example, in an X-ray CT scan of a cell phone, one can define the cell phone as a whole as the "object" while another may define the cell phone by its constituent parts: battery, electronics, plastic case, leather case, screen, buttons, etc. Further, any given application may need to redefine the object definition by grouping the constituent components differently. This constitutes the object philosophy problem, that is, how a complex object is represented after image segmentation completes; is the object represented by a single group of pixels or by multiple groups that represent the constituent parts.

Traditional image segmentation is forced to decide a fixed grouping of pixels and often it is the case that this grouping is formed incorrectly. Embodiments of the invention, meanwhile, encourage the creation of object fragments, or smaller regions of pixels that have similar characteristics, but can be considered to not decide an object philosophy.

FIG. 1 is a flowchart illustrating an example method according to the invention.

In a first step S102, an image is processed and all fragments in the image are identified. An "object" is a set of one or more fragments. In embodiments, fragments are small groups of one or more pixels that are considered "similar". The term "similar" is application dependent and varies according to imaging modality, variables stored at each pixel, and the ultimate task at hand. The goal in forming fragments is to insure that the object philosophy problem has been avoided by not merging too much, essentially insuring that objects have not been incorrectly merged with one another.

The image can be, for example, data from a digital photograph, a MRI/CT scan, an X-ray radiograph, infrared and/or near-infrared imaging, neutron radiographs or 3D reconstructed scans, video and/or video streams, a micro-CT scan, a PET and/or PET/CT scan, etc.

In a next step S104, a fragment signature is extracted from each fragment (i.e. group of pixels) and assigned to that fragment. This constitutes the fragment signature. The signature characteristics again depend upon the image modality and application. For a traditional digital photograph consisting of RGB data, this could include the R, G, and B components as well as hue, saturation, lightness, and gradients of the various variables that can be gleaned from the image data.

Next in step S106 a fragment tree (or graph) is constructed by, for each fragment Fi, comparing the signature of Fi to all neighboring fragments Fj where i and j are fragment indices. Embodiments of the invention include a similarity metric similarity(Fi, Fj) that determines how alike two fragments are by comparing their respective signatures. For example, assume that a similarity value of zero constitutes an exact match between signatures and a positive value represents dissimilar signatures proportional to their differences. Then a threshold T is used such that fragments having a similarity below this threshold are "joined" in the tree (or graph) representation.

Performing this comparison for each fragment and joining each fragment to its neighbors that are similar constructs a fragment tree (or graph). The distinction between a graph and tree is that in a graph structure, fragments are merely connected one to another and in a tree structure, unions of fragments are parented to (possibly virtual) tree node that represents the clade of fragments beneath that node.

In embodiments, an object within a fragment tree is then defined as a single node and the clade it represents. In a fragment graph, an object is represented by a group of fragments. The accumulation of signatures for all fragments constituting the object thus define the signature for the object.

In embodiments, a next step S108 includes performing operations on fragment trees. One operation on a fragment tree is to match an object signature to portions of the fragment tree in order to identify the constituent fragments that constitute the object of interest (i.e., the object being searched for) and ultimately the pixels that represent the constituent fragments. Once the pixels are identified, numerous post-processing techniques can be applied on the identified pixels such as highlighting in a user interface, extraction of additional characteristics, and numerous more operations. Those skilled in the art will be able to understand how to implement these operations, using software and user interface commands for example, after being taught by the present examples.

Figure 2:
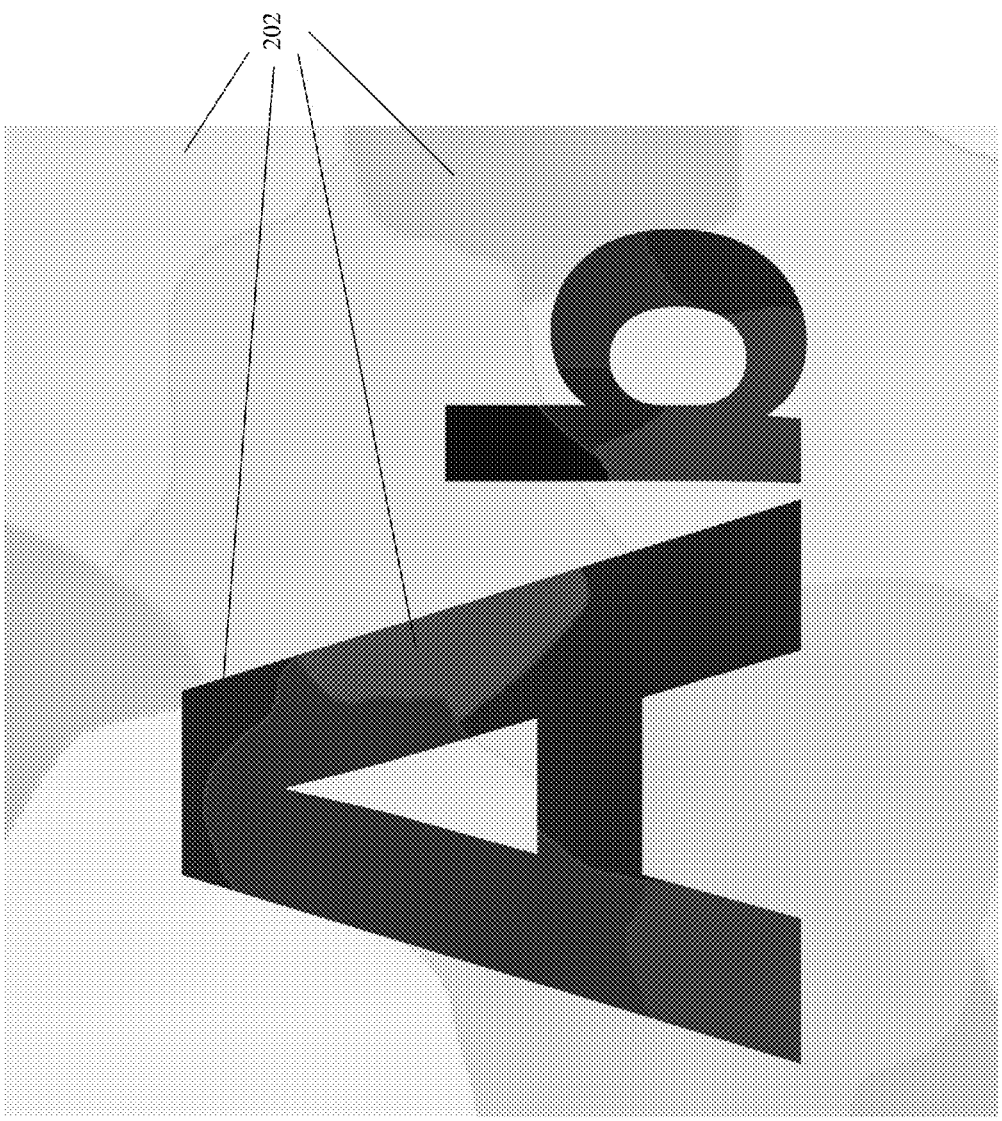
FIG. 2 is an example 2D image for illustrating certain aspects of the present invention.

To assist in understanding aspects of an image segmentation methodology according to embodiments of the invention, FIG. 2 is an example 2D grayscale image showing a sample image having three main components (or image objects) including a letter "A", a letter "b", and a background. As shown in FIG. 2, the image has been decomposed by some process into fragments indicated by the grayscale patches 202.

Figure 3A:
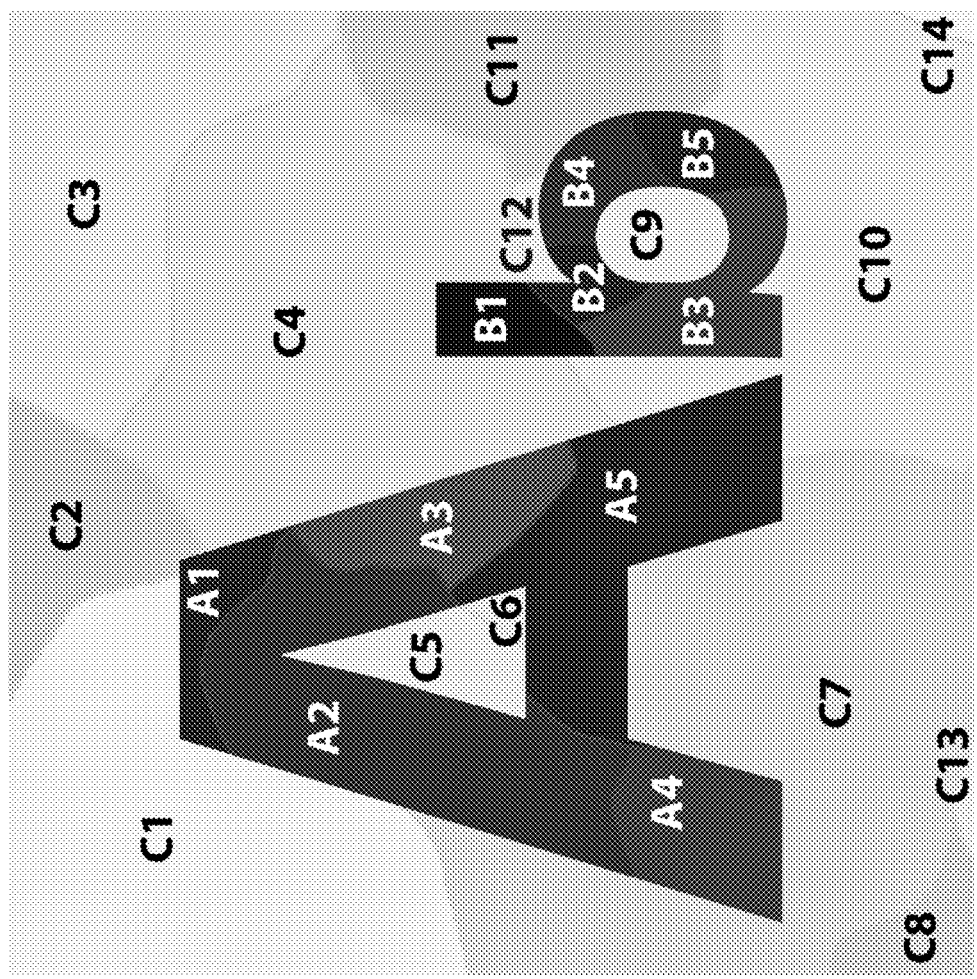
FIGS. 3A to 3G illustrate an example process of creating a fragment tree from the image in FIG. 2 according to embodiments of the invention.
Figure 3B:
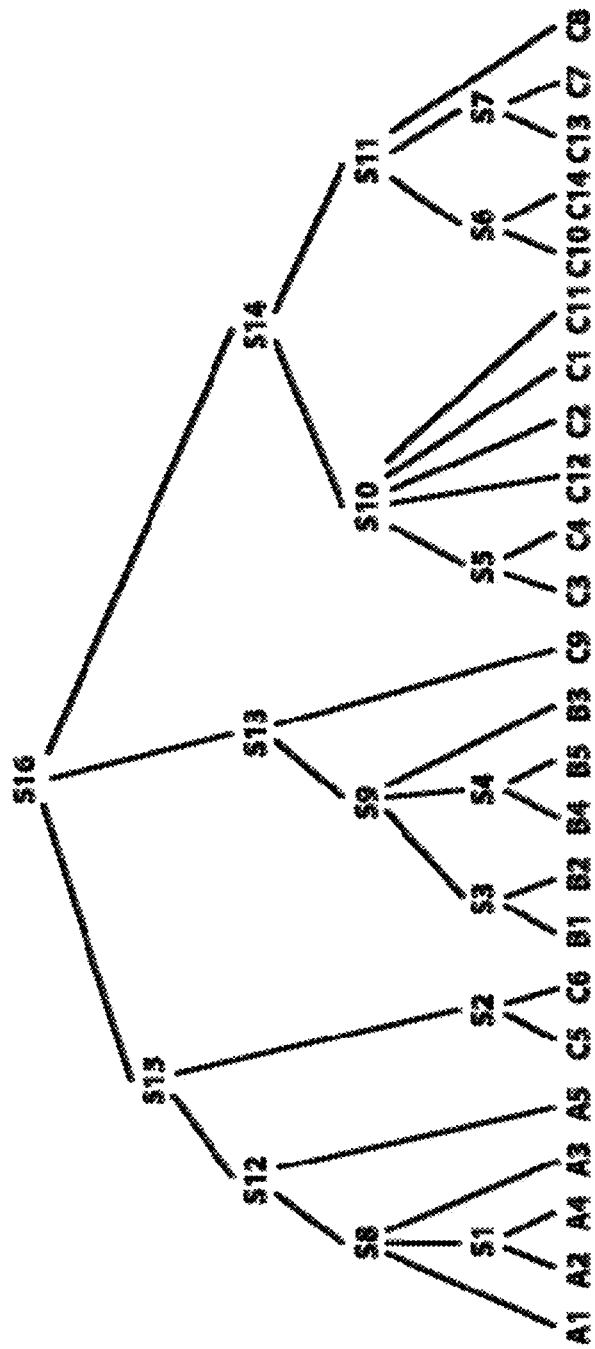

FIGS. 3A to 3G illustrate an example creation of a fragment tree for the image shown in FIG. 2 according to embodiments of the invention. As shown in FIG. 3A, a first step is to label the fragments. In this example, the letter "A" is decomposed into fragments {A1, A2, A3, A4, A5}, the letter "b" is decomposed into fragments {B1, B2, B3, B4, B5}, and the background is decomposed into fragments {C1, C2, C3, C4, C5, C6, C7, C8, C9, C10, C11, C12, C13, C14}. Using the signatures of the fragments (e.g. grayscale level in this example) as described in S104, a fragment tree is created as described above in connection with S106. For example, FIG. 3B shows a possible fragment generated by merging fragments A2 and A4 into S1; C5 and C6 into S2; B1 and B2 into S3; B4 and B5 into S4; C3 and C4 into S5; C10 and C14 into S6; C13 and C7 into S7; A1, S1, and A3 into S8; S3, S4, and B3 into S9; S5, C12, C2, C1, and C11 into S10; S6, S7, and C8 into S11; S8 and A5 into S12, S9 and C9 into S13; S10 and S11 into S14; S12 and S2 into S15; and finally S15, S13, and S14 into the root node S16. It is not required that the fragment tree parent to a single root node.

Figure 3C:
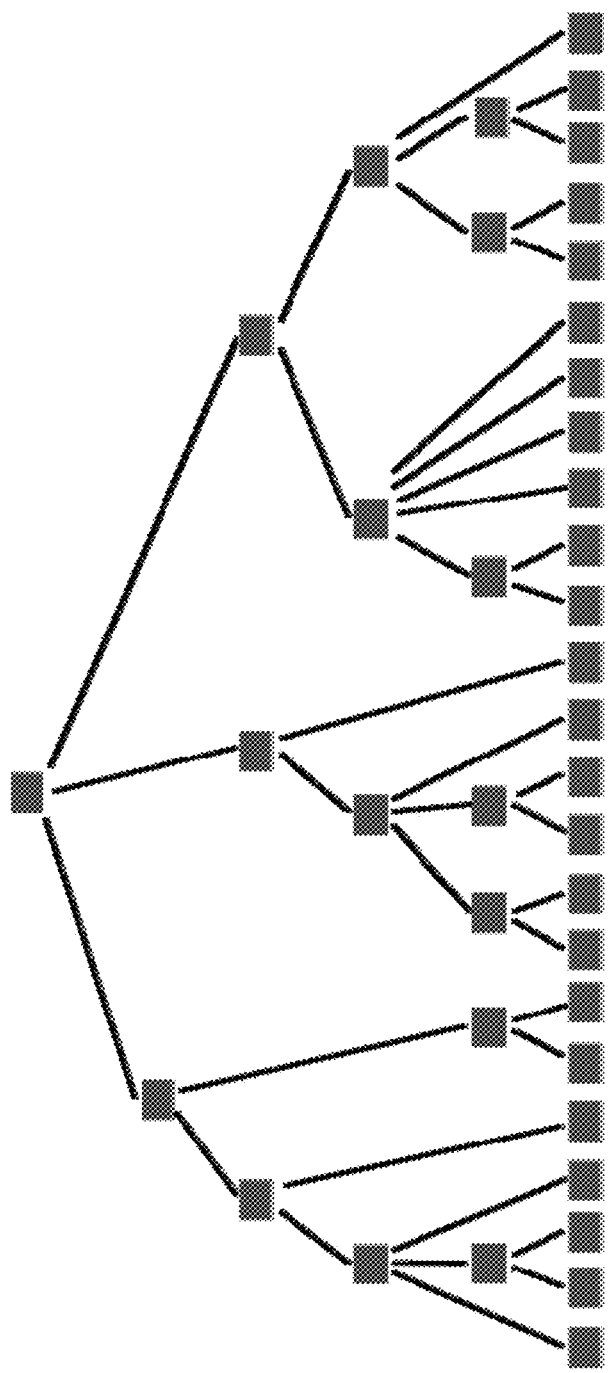
Figure 3D:
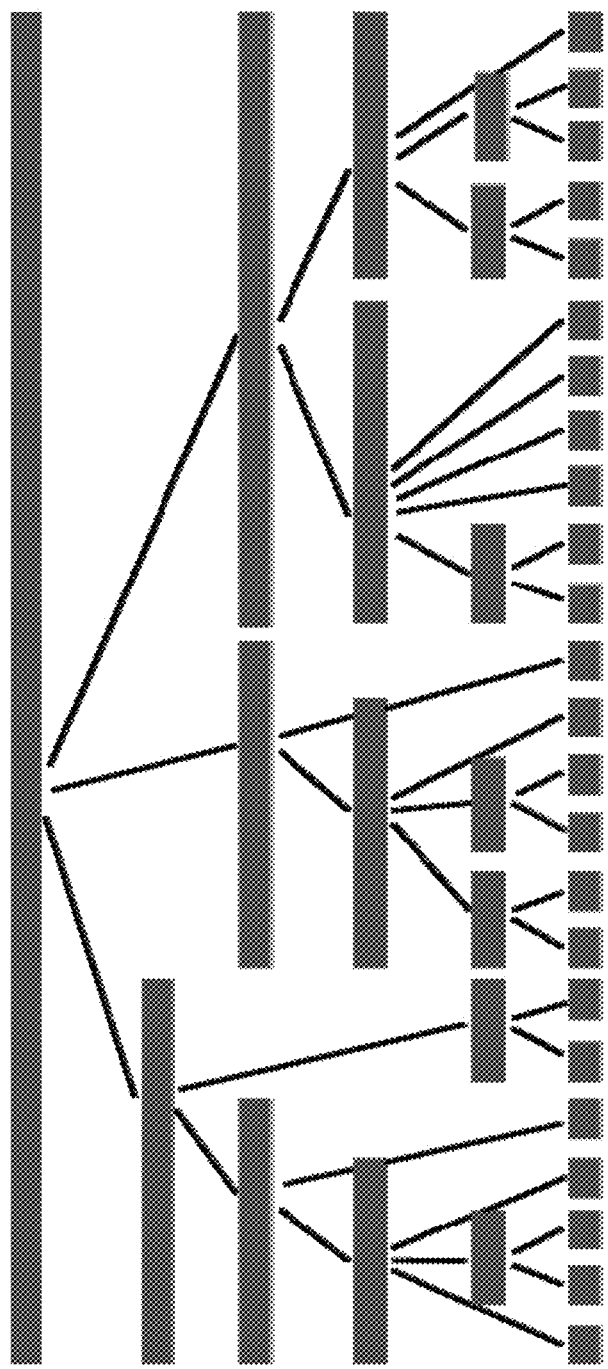
Figure 3E:
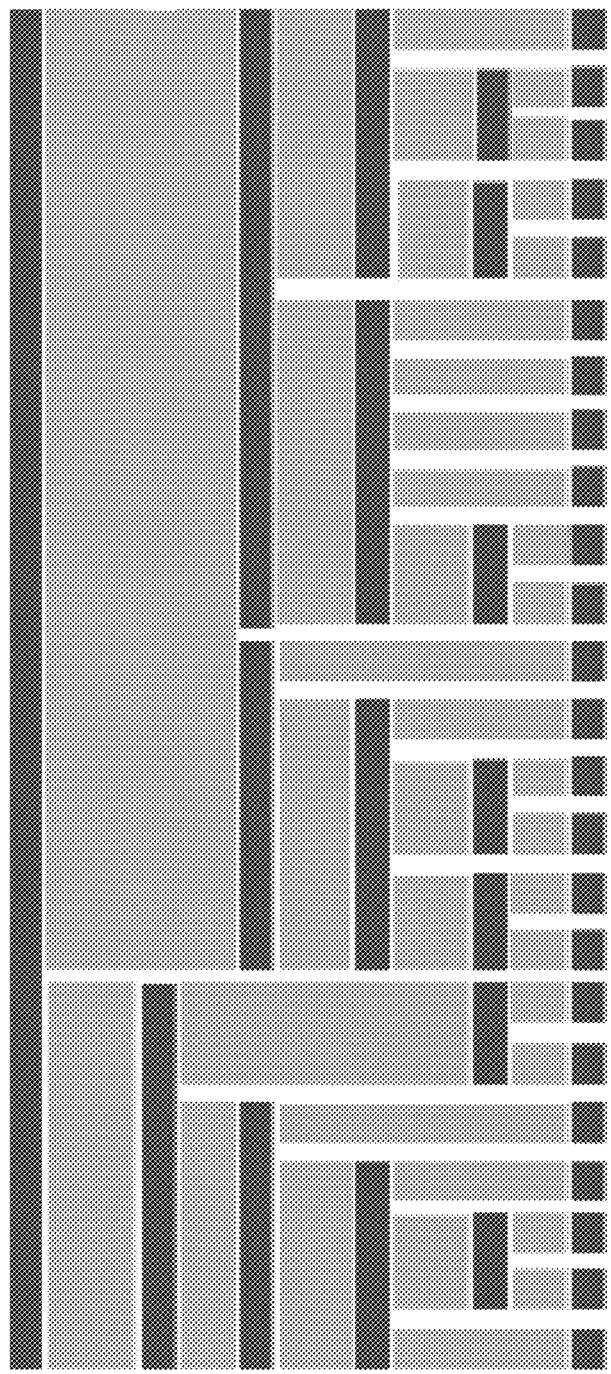
Figure 3F:
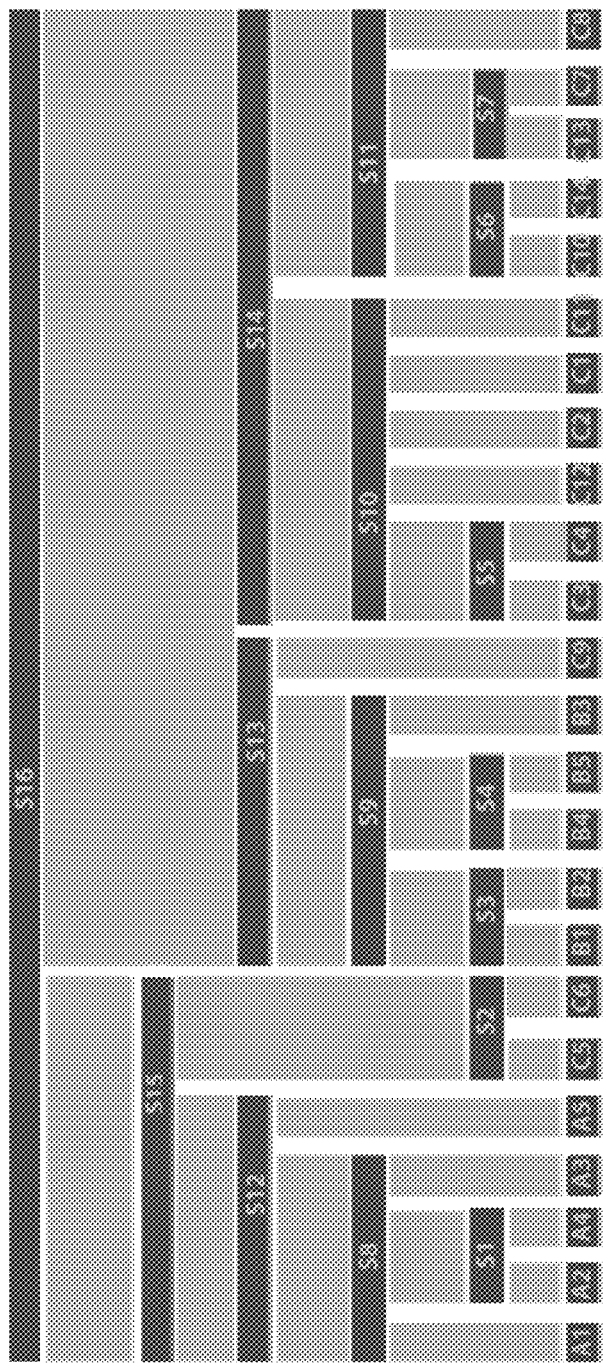
Figure 3G:
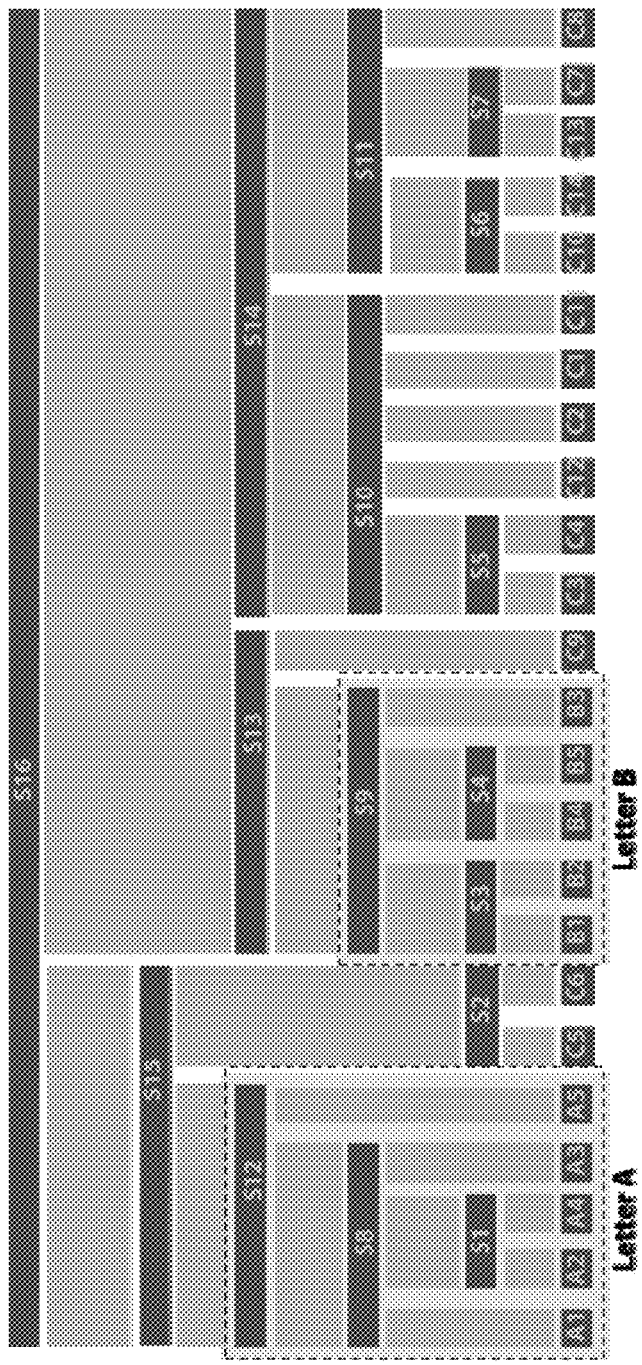

To improve visualization and user interface interaction with the fragment tree, the fragments can be rendered as boxes as shown in FIG. 3C. Furthermore, the width of the parent node boxes can be expanded to represent the width of the child nodes beneath each parent node as shown in FIG. 3D. The parenting lines can also be replaced by boxes to indicate parent relationships as shown in FIG. 3E. Fragment labels are added back in FIG. 3F. Finally, selected regions can be indicated by highlighted boxes around the selected fragments as indicated in FIG. 3G. In this case, the clades representing the letters "A" and "b" are shown. Those skilled in the art will appreciate that by selecting these highlighted boxes in FIG. 3G, the corresponding pixels in the images shown in FIG. 2 can be selected, thereby automatically identifying the letters "A" and "b" in the image using the fragment tree.

It is noted that the width of the boxes can take several meanings within the tree such as how much of the following each node represents: total number of pixels, area, volume, or number of child nodes. Varying the meaning of the box width can elicit different information regarding the selected fragments and ultimately the image objects they represent.

It is further noted that it is possible to construct a multi-resolution hierarchical representation of image data regions—i.e, connecting fragments to those of up-sampled, down-sampled, higher, and/or lower resolutions of an image. For example, a full resolution image can be down sampled to smaller image dimensions, filtered, or otherwise manipulated in some way to change the image data such as processing via a low-pass filter to remove high-frequency noise. Fragments can be generated for the original image as well as the filtered image and fragments from each image can by mixed when constructing the fragment tree.

It should be further noted that it is possible to perform construction of a graph-based relationship among fragments that is not necessarily hierarchical. The descriptions above have referred to a fragment tree such that each node in the tree has only one parent and includes no cycles in the resulting tree. It is possible to instead for a graph-based representation which may include cycles.

Moreover, extraction of signatures of fragment regions and propagation throughout the fragment tree is possible. This can include, for example, extracting image characteristics for small leaf fragments and accumulating characteristics upward in the tree such that parent nodes encompass characteristics of child nodes, or the clade represented by the parent node. In this regard, fragment signature such as mean value of all pixels that a fragment consists of can be propagated upward when constructing a fragment tree to improve querying performance when operating on the tree. For example, mean intensity values can be computed for all leaf fragments {A1, . . . , A5, B1, . . . , B5, C1, . . . , C14} shown in FIG. 3B. When combining fragments to form structural nodes during the fragment tree construction process the child node signatures can be combined and propagated upward to the structural node so that information can be garnered directly from that node. For example, the mean values of A2 and A4 can be combined proportionally depending upon the number of pixels each fragment represents and provided to node S1 so that that value accurately represents the mean value of its children. Further, when combining two structural nodes, the same combination of signatures can occur such as for node S12 and S2 when forming node S15 so that S15 then accurately represents its children.

FIG. 4 illustrates an example operation using fragment trees in accordance with embodiments of the invention. The illustrated example operation is the selection of groups of fragments in order to select an image feature. In this case, one of the cells shown in the image of FIG. 4A is selected via the corresponding fragment tree that has been generated for the image according to the invention and shown in FIG. 4B. FIG. 4B further indicates which fragments 402 have been selected in the fragment tree and FIG. 4A further indicates the pixels 404 in the image represented by the selected fragments 402 in the fragment tree.

Many other operations using the fragment trees are possible. For example, if a series of images of the same scene is taken over time, matching can be performed within the hierarchy to match nodes of the hierarchy—which actually matches objects to one another. For example, consider a video of a bird flying around. The bird can be tracked from frame to frame by comparing the object hierarchies of each frame and matching nodes (objects) of the hierarchy/tree. Thus, if the bird object is selected in the first frame, the same bird object in subsequent frames can be found by matching those characteristics in subsequent frame hierarchies.

As another example, the techniques of the invention can be used for evaluating a series of CT scans of cancer patients to track tumors over time. Thus, a baseline CT scan can be taken of a patient prior to starting chemotherapy, for example. The radiologist can mark a set of tumors as those they want to monitor over time. Then, as chemotherapy proceeds, subsequent CT scans of the patient are taken. An object hierarchy of each scan is produced and matched to the previous scan. Then, the invention can be used to find the "selected" tumors and compute characteristics (such as volume, mass, density, intensity histogram, etc.) for each tumor in each scan and from that to determine whether the tumor is growing or dying. This determines whether treatment effectiveness and guides whether the patient should continue or stop treatment.

Another example operation includes searching or traversing the fragment tree and matching a predefined signature to those in the tree to perform object identification, or finding objects in an image [please provide some descriptions. Given a signature, such as a mean value for an object of interest, a fragment tree can be searched top-down (either breadth-first or depth-first) and each traversed node can be compared to the signature of the object of interest. When a match is found, the searching may or may not be terminated depending upon the application. The clade represented by the matched node thus represents an image object matching the signature of the object of interest.

Another example operation includes matching several clades of the fragment tree to identify similar regions among one or more images. A particular searching application may involve identifying clades within the fragment tree that correspond to multiple signatures (or objects of interest). For example, one by be concerned with identifying cells phones in CT scans. The cell phone "signature" may consist of multiple components representing a battery, plastic case, and electronics. When searching an unknown CT scan, each component can be searched for independently and may or may not match clades within the unknown CT's fragment tree. However, a match to a cell phone may only occur if all necessary components (battery, plastic case, and electronics) are found within the unknown CT's fragment tree.

Another example operation includes matching several clades of the fragment tree and by process of elimination identifying differences between one or more images. In real-world applications, it may be necessary to employ a process of elimination strategy for matching an object database to an unknown image. For example, assume we have an object database describing organs within a human: heart, kidneys, lungs, liver, etc. Given a new patient scan/image, the task of matching the organs to the patient of interest is challenging. However, it may be possible to achieve confident matches first and less certain matches later in an algorithmic process. For example, the human heart may have such a unique signature that it is easy to identify in all patient scans. In which case, one can search for that organ in the patient of interest's fragment tree first, identify the matching clade, and then "remove" that clade from subsequent search operations. Then, the next most confident organ can be search for, such as the liver, in which case one can guarantee that the liver-matching step will certainly not incorrectly match with fragment clade identified for the heart. Continuing this process of removing clades as they are matched facilitates the process of elimination for less-certain objects of interest—and improves the likelihood of correctly matching those less-certain objects.

Another example operation includes counting the number of matches of object signatures within a fragment tree. Counting the total number of objects within an image is a common task whether the "objects" are people, faces, animals, cells, manufactured parts etc. The applications are nearly endless. The counting operation can be performed on a fragment tree by repeatedly searching for the same object of interest signature within the fragment tree. This will then result in identifying several clades that match the signature or interest. Counting the total number of matching clades thus addresses the counting of the objects of interest within the image.

Another example operation includes tracking spatial location of fragments within the tree—and utilizing spatial location of matched fragments for some purpose. Each fragment is associated with a set of pixels within the image being processed. The location of these pixels can be stored within each fragment so that when searching a fragment tree for an object of interest, the location within the image of the matched clade (or fragment), such as average pixel position or bounding box, can easily be obtained and indicated to the operator.

Figure 5:
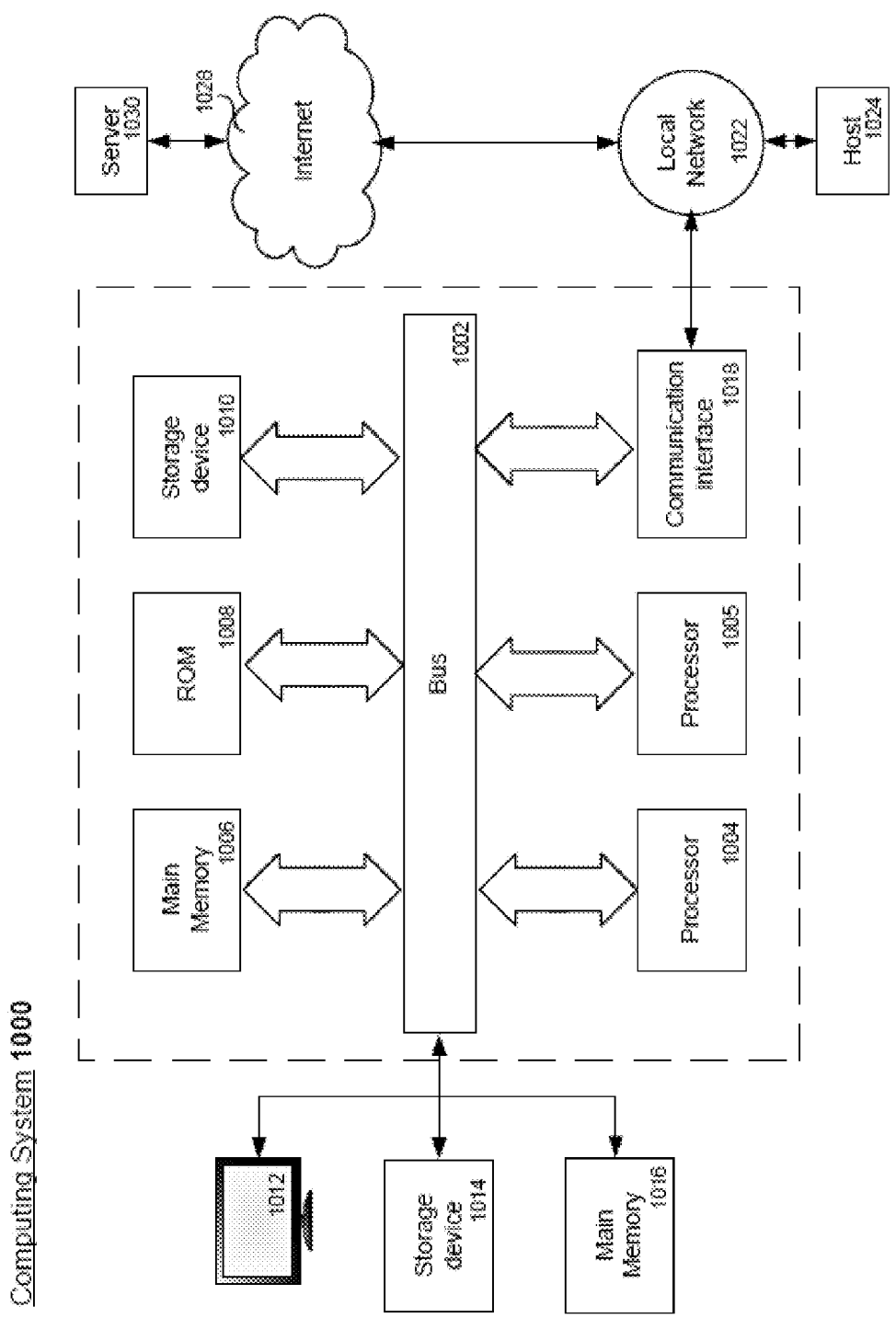
FIG. 5 is a block diagram of an example system according to embodiments of the invention.

As shown in FIG. 5, certain embodiments of the invention employ a processing system that includes at least one computing system 1000 deployed to perform certain of the steps described above. Computing systems may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a surgical system or other medical management system. In one example, computing system 1000 comprises a bus 1002 and/or other mechanisms for communicating between processors, whether those processors are integral to the computing system 100 (e.g. 1004, 1005) or located in different, perhaps physically separated computing systems 1000.

Computing system 1000 also typically comprises memory 1006 that may include one or more of random access memory ("RAM"), static memory, cache, flash memory and any other suitable type of storage device that can be coupled to bus 1002. Memory 1006 can be used for storing instructions and data that can cause one or more of processors 1004 and 1005 to perform a desired process. Main memory 1006 may be used for storing transient and/or temporary data such as variables and intermediate information generated and/or used during execution of the instructions by processor 1004 or 1005. Computing system 1000 also typically comprises non-volatile storage such as read only memory ("ROM") 1008, flash memory, memory cards or the like; non-volatile storage may be connected to the bus 1002, but may equally be connected using a high-speed universal serial bus (USB), Firewire or other such bus that is coupled to bus 1002. Non-volatile storage can be used for storing configuration, and other information, including instructions executed by processors 1004 and/or 1005. Non-volatile storage may also include mass storage device 1010, such as a magnetic disk, optical disk, flash disk that may be directly or indirectly coupled to bus 1002 and used for storing instructions to be executed by processors 1004 and/or 1005, as well as other information.

Computing system 1000 may provide an output for a display system 1012, such as an LCD flat panel display, including touch panel displays, electroluminescent display, plasma display, cathode ray tube or other display device that can be configured and adapted to receive and display information to a user of computing system 1000. In that regard, display 1012 may be provided as a remote terminal or in a session on a different computing system 1000. For example, a surgical system used in a sterile operating theater may receive images from a graphics processor that processes image data under control of a surgeon, other medical practitioner or other user. An input device 1014 is generally provided locally or through a remote system and typically provides for alphanumeric input as well as cursor control 1016 input, such as a mouse, a trackball, etc. It will be appreciated that input and output can be provided to a wireless device such as a PDA, a tablet computer or other system suitable equipped to display the images and provide user input.

According to one embodiment of the invention, portions of the methodologies described above, for example, segmenting objects of interest in an image scan, may be performed by computing system 1000. Processor 1004 executes one or more sequences of instructions. For example, such instructions may be stored in main memory 1006, having been received from a computer-readable medium such as storage device 1010. Execution of the sequences of instructions contained in main memory 1006 causes processor 1004 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 1004 and/or 1005, particularly where the instructions are to be executed by processor 1004 and/or 1005 and/or other peripheral of the processing system. Such medium can include non-volatile storage and volatile storage. Non-volatile storage may be embodied on media such as optical or magnetic disks, including DVD, CD-ROM and BluRay. Storage may be provided locally and in physical proximity to processors 1004 and 1005 or remotely, typically by use of network connection. Non-volatile storage may be removable from computing system 1004, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, RAM, PROM, EPROM, FLASH/EEPROM, any other memory chip or cartridge, or any other medium from which a computer can read.

Transmission media can be used to connect elements of the processing system and/or components of computing system 1000. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 1004 and/or 1005. For example, the instructions may initially be retrieved from a magnetic disk of a remote computer and transmitted over a network or modem to computing system 1000. The instructions may optionally be stored in a different storage or a different part of storage prior to or during execution.

Computing system 1000 may include a communication interface 1018 that provides two-way data communication over a network 1020 that can include a local network 1022, a wide area network or some combination of the two. For example, an integrated services digital network (ISDN) may be used in combination with a local area network (LAN). In another example, a LAN may include a wireless link. Network link 1020 typically provides data communication through one or more networks to other data devices. For example, network link 1020 may provide a connection through local network 1022 to a host computer 1024 or to a wide area network such as the Internet 1028. Local network 1022 and Internet 1028 may both use electrical, electromagnetic or optical signals that carry digital data streams.

Computing system 1000 can use one or more networks to send messages and data, including program code and other information. In the Internet example, a server 1030 might transmit a requested code for an application program through Internet 1028 and may receive in response a downloaded application that provides for the anatomical delineation described in the examples above. The received code may be executed by processor 1004 and/or 1005.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
    identifying fragments in an image, wherein a plurality of certain of the fragments collectively correspond to a single object of interest in the image; and
    constructing a fragment tree representation of the image by comparing characteristics of the fragments in the image to one another to establish a relationship between the fragments.

2. A method according to claim 1, further comprising identifying the object of interest in the image using the fragment tree representation.

3. A method according to claim 1, wherein constructing includes creating a multi-resolution hierarchical representation of regions in the image.

4. A method according to claim 1, wherein constructing includes extracting signatures of the fragments and propagating signatures for related fragments upward in the fragment tree representation such that parent nodes encompass characteristics of child nodes in the fragment tree representation.

5. A method according to claim 1, further comprising defining the object of interest based on characteristics extracted from a group of fragments selected from the fragment tree representation.

6. A method according to claim 1, further comprising searching or traversing the fragment tree representation and matching a predefined signature to signatures of fragments in the fragment tree representation to identify objects in the image.

7. A method according to claim 1, further comprising matching several clades of the fragment tree representation and by process of elimination identifying differences between one or more images.

8. A method according to claim 1, further comprising counting the number of matches of object signatures within the fragment tree representation.

9. A method according to claim 1, further comprising tracking image spatial locations corresponding to fragments within the fragment tree representation.

10. A method according to claim 9, wherein image spatial locations comprise pixels in the image corresponding to the fragments.

11. A method according to claim 1, wherein constructing the fragment tree representation further includes performing a graph-based relationship among fragments such that the fragment tree representation includes cycles.

12. A method comprising:
identifying fragments in an image, wherein each fragment comprises one or more adjacent pixels in a two-dimensional image or one or more adjacent voxels in a three-dimensional image; and
constructing a fragment tree representation of the image by comparing characteristics of the fragments in the image to one another, wherein a hierarchical grouping together of a group of the fragments in the fragment tree representation is formed in accordance with a determined relationship between the group of fragments.

13. A method according to claim 12, further comprising identifying an object of interest in the image using the hierarchical grouping of the group of fragments in the fragment tree representation.

14. A method according to claim 13, further comprising identifying all of the pixels in the image belonging to the object of interest using the hierarchical grouping of the group of fragments.

15. A method according to claim 12, wherein forming the hierarchical grouping of the group of fragments includes extracting image characteristics of the fragments and propagating signatures of the extracted image characteristics for joined fragments in the group upward in the fragment tree representation such that a parent node in the hierarchical grouping encompasses the extracted image characteristics of child nodes in the hierarchical grouping.

16. A method according to claim 15, wherein a difference between the extracted image characteristics of the joined fragments is less than a threshold.

17. A method according to claim 15, further comprising searching the fragment tree representation for an identified parent node that has a signature of the extracted image characteristics matching a predefined signature to identify an object of interest in the image.

18. A method according to claim 15, wherein the extracted image characteristics include R, G and B components of the pixels of the fragments.

19. A method according to claim 12, wherein the group of fragments are all spatially adjacent with each other in the image.

20. A method according to claim 12, further comprising:
constructing a second fragment tree representation of a second image; and
identifying a common object of interest in both the image and the second image using the fragment tree representation and the second fragment tree representation.

* * * * *